United States Patent [19]

Klager

[11] Patent Number: 5,010,794
[45] Date of Patent: Apr. 30, 1991

[54] HYDROSTATIC SPINDLE DEVICE

[76] Inventor: Earl E. Klager, 8220 Klager Rd., Saline, Mich. 48176

[21] Appl. No.: 459,183

[22] Filed: Feb. 5, 1990

[51] Int. Cl.$^5$ .............................................. B23B 19/02
[52] U.S. Cl. .................................... 82/147; 409/231; 384/12; 384/107
[58] Field of Search ......................... 82/147; 409/231; 384/12, 100, 107

[56] References Cited

U.S. PATENT DOCUMENTS

| | | | |
|---|---|---|---|
| 3,438,287 | 4/1969 | Kampmeier | 82/147 |
| 3,522,761 | 8/1970 | Arneson | 384/12 |
| 3,806,208 | 4/1974 | Bruck | 384/107 |
| 4,438,339 | 3/1984 | McHugh | 384/107 |
| 4,596,169 | 6/1986 | Inoue et al. | 82/147 |
| 4,682,920 | 7/1987 | Rodgers | 384/107 |

Primary Examiner—Frederick R. Schmidt
Assistant Examiner—Lawrence Cruz

[57] ABSTRACT

A hydrostatic spindle device has a housing, a hydrostatic radial bearing at each end of the housing, a spindle rotatably and translatably supported by the hydrostatic radial bearings, and extending through the bearings. A hydraulic motor is attached to one end of the spindle and a cutting tool or workpiece is attached to the other end. The interior of the housing comprises a cylinder in which a piston, fashioned integral with the spindle travels. Pressurized hydraulic fluid suitably introduced by an electrohydraulic servo control system precisely controls the translational position, velocity, and acceleration of the spindle. Hydrostatic thrust bearings at each end of the cylinder prevent the piston, when rotating, from wearing either end surface of the cylinder.

1 Claim, 3 Drawing Sheets

HYDROSTATIC SPINDLE DEVICE

TECHNICAL FIELD

The present invention relates to a spindle device used as a lathe, drill, milling machine, grinder, etc., for the purpose of accurately rotating and positioning or feeding a workpiece or cutting tool.

BACKGROUND

Machine tools normally consist of a spindle, rotatably driven for the purpose of driving a workpiece for cutting tool, and a means to bring the workpiece or cutting tool into proper relationship with one another to effect the machining operation. Usual practice is to provide a slide upon which the spindle device or workpiece is mounted, or to provide a separate quill around the spindle which can be translated. These means require more moving parts, are usually larger, and seldom can provide the accuracy of the present invention.

SUMMARY OF THE INVENTION

The object of the present invention is to provide a compact, precision, rotating and translating spindle supported on hydrostatic radial bearings so that the translational position, velocity, and acceleration of the spindle can be accurately controlled. Also incorporated into this invention is a means to prevent the rotating piston, integral with the spindle, from wearing the ends of the cylinder as it nears the limits of its translational movement.

A hydraulic motor, suitably controlled, is directly mounted on one end of the spindle to provide variable speed rotation in either direction. It moves translatably with the spindle and is restrained from counter rotating by a slide arrangement. Hydrostatic radial bearings of the well known inlet restrictor type support the spindle at each end of the housing. The self compensating nature of hydrostatic radial bearings insures the spindle is constantly forced toward a true center. Since translation motion of the spindle is also guided on the same bearings, it too is very precise. The housing between the hydrostatic radial bearings not only supports the entire spindle device, but comprises a cylinder concentric with the spindle. A piston formed integral with the spindle travels inside the cylinder in response to hydraulic fluid controllably introduced to cause the spindle to translate. The piston, being constrained between hydrostatic radial bearings, provides stable centerline thrust, thereby maintaining spindle alignment.

These and other objects and features of the present invention will become more apparent from the following description with reference to the accompanying drawings.

DESCRIPTION OF THE PREFERRED EMBODIMENTS

Figure 2:
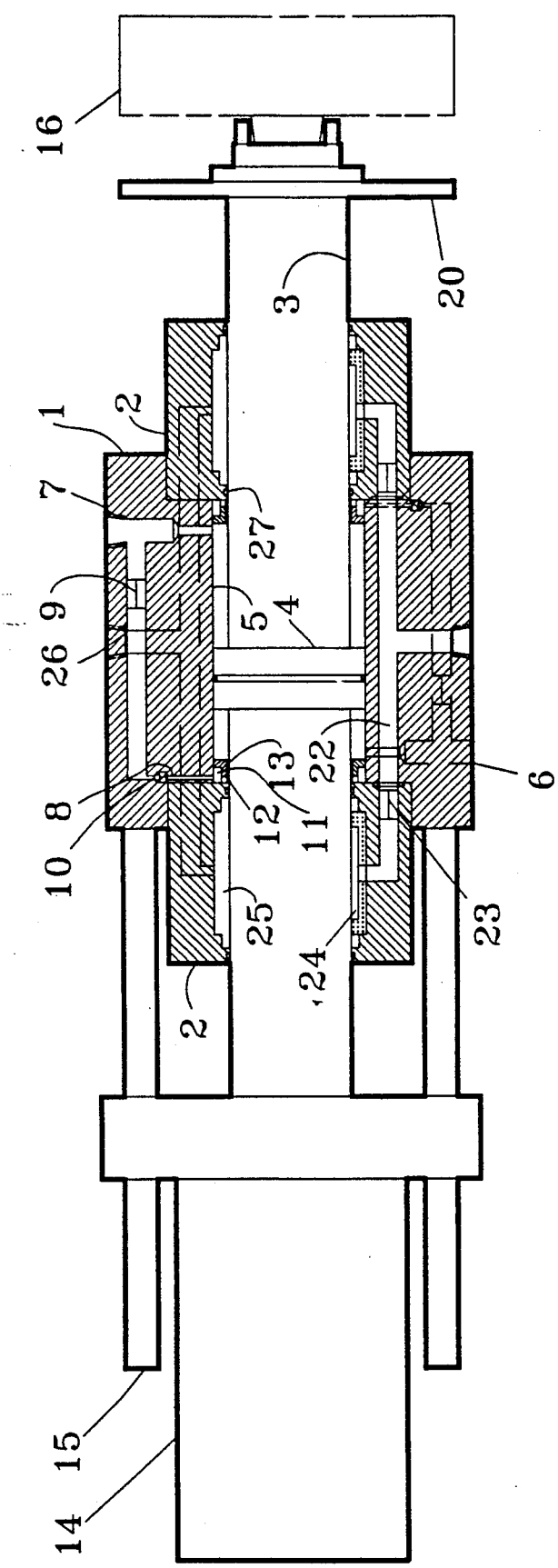
FIGS. 2 and 3, which are broken away views, together constitute a sectioned view of an embodiment according to the present invention.
Figure 3:
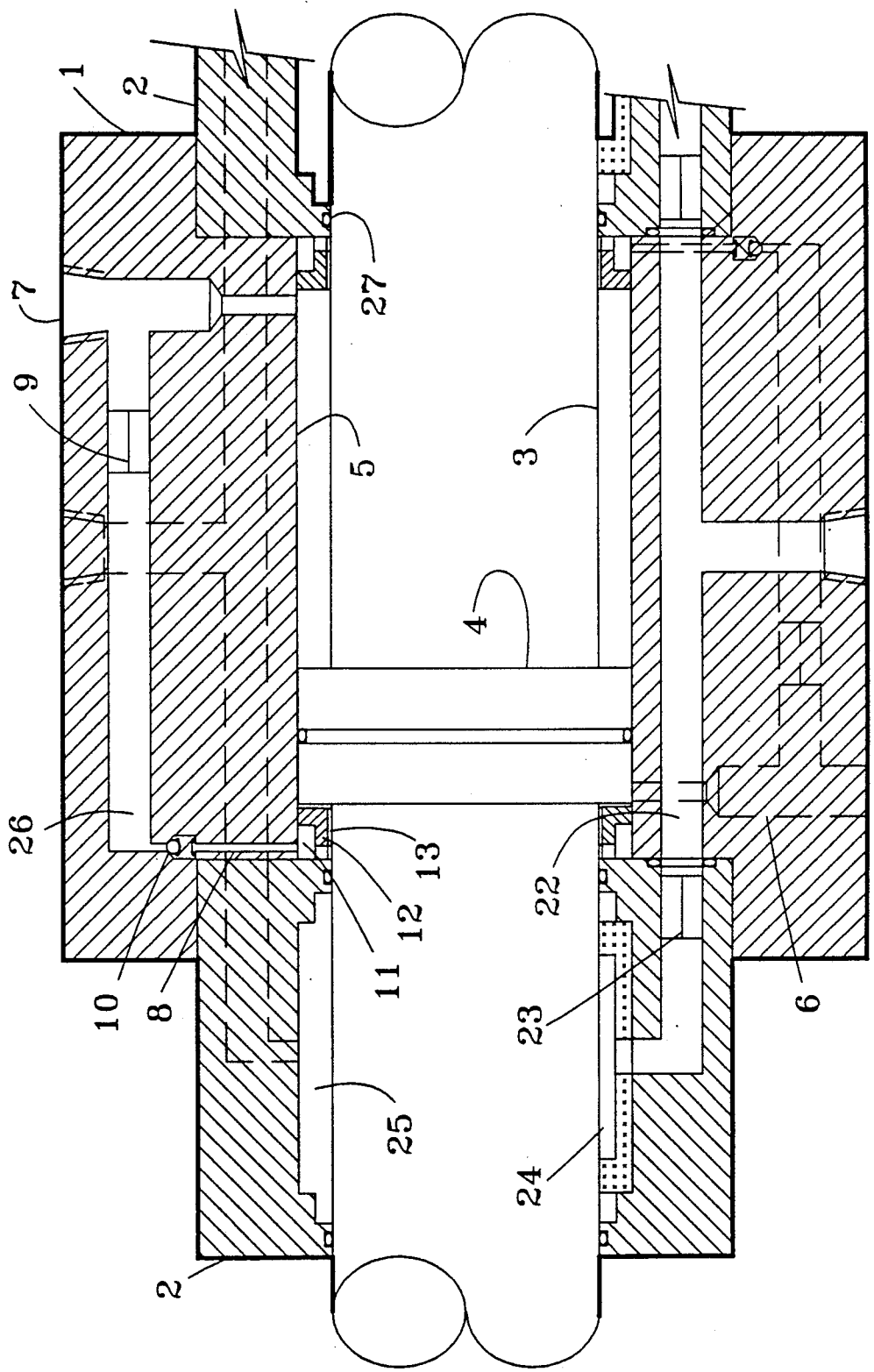

FIGS. 2 and 3 show sectioned views of a spindle device to which the present invention is applied. The spindle device comprises a housing 1, hydrostatic radial bearings 2 attached to each end of the housing 1, and a spindle 3 supported rotatable and translatable by and extending through the hydrostatic radial bearings 2. The hydrostatic radial bearings 2 are of the well known inlet restrictor type. Hydraulic fluid under pressure flows from passage 22 drilled through housing 1, through adjustable flow restrictor 23 to pressure pad 24. Drain area 25 collects the hydraulic fluid overflow, returning it via passage 26 to the oil reservoir of hydraulic power unit 21. Each hydrostatic radial bearing 2 has three pressure pads 24 and three drain areas 25 equally spaced around the circumference in a manner well known to those familiar with the art.

A piston 4, formed integral with spindle 3, translates in cylinder 5 of housing 1. Pressurized hydraulic fluid introduced into cylinder 5 by a metering device such as a four way valve (not shown) or electrohydraulic servo valve 17 through ports 6 and 7 controls the translational position, velocity, and acceleration of piston 4 and spindle 3 to effect the desired machining operation.

As piston 4 nears the end of cylinder 5, at for example port 6 end (see FIG. 3), port 6 is gradually closed by piston 5. In this case port 6 is the exit port and port 7 is the inlet port. Another port 8 is connected to port 7 on the opposite side of piston 4. Hydraulic fluid flowing through restrictor 9, as port 7 is pressurized, passes through check valve 10 into annulus 11 of a bearing material thrust ring 12. Said hydraulic fluid flows through a clearance 13 between thrust ring 12 and spindle 3 to hold piston 4 an infinitesimal distance away from thrust ring 12, and thus prevents wear from the action of a rotating piston 4 against thrust ring 12. A similar sequence of events occurs as piston 4 approaches port 7, but is not shown. However, as piston 4 travels toward port 7, port 6 is pressurized. Hydraulic fluid which would escape through clearance 13 and port 8 is prevented from doing so by check valve 10 which is now closed. Seals 27 restrict hydraulic fluid from entering either radial hydrostatic bearing 2.

Spindle 3 is driven rotatably by hydraulic motor 14 directly connected to one end. Hydraulic motor housing 14 is prevented from counter rotating by slide rods 15 attached to housing 1. The opposite end of spindle 3 holds a cutting tool or workpiece 16.

Figure 1:
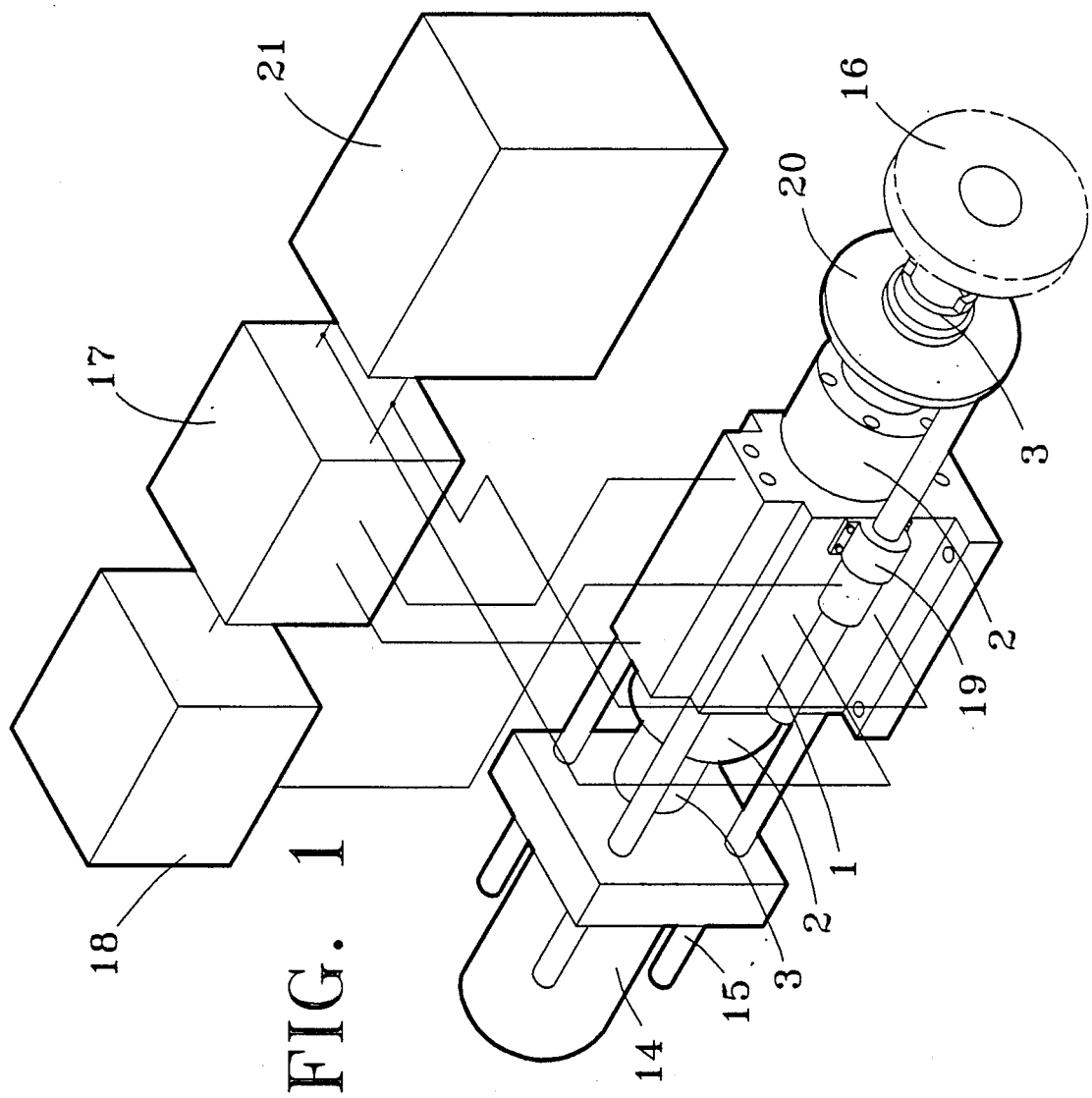
FIG. 1 is a perspective view of the spindle device showing the relationship of essential elements, and a diagramatic representation of the translational control system.

In the present embodiment of the invention control of the translational position, velocity, and acceleration of spindle 3 is shown in FIG. 1. A command signal specifying desired translational position, velocity, and acceleration is introduced into servo controller 18. A transducer 19, which contacts disc 20 feeds back the actual translational position, velocity, and acceleration of spindle 3. Servo controller 18 compares the command and feedback signals and sends any error signal to electrohydraulic servo valve 17. To correct any difference between the command and feedback signals electrohydraulic servo valve 17 receives pressurized hydraulic fluid from hydraulic power unit 21 and applies it appropriately to port 6 or 7 to move piston 4 and spindle 3. Thus, any desired translational position, velocity, and acceleration of spindle 3 can be achieved. Hydraulic power unit 21 also provides pressurized fluid for both hydrostatic radial bearings 2 and for hydraulic motor 14 through suitable control devices (not shown) in the present embodiment.

Another embodiment of the present invention eliminates servo controller 18, transducer 19, disc 20, and replaces electrohydraulic servo valve 17 with a manually operated four way hydraulic valve (not shown). This provides less precise control of translational position, velocity, and acceleration of spindle 3. However, it is adequate for many machine operations such as drilling, reaming, and honing.

While the invention has been described in conjunction with the preferred embodiments thereof, it will be understood that this description is intended to illustrate and not limit the scope of the invention which is defined by the following claim.

What is claimed is:

1. A hydrostatic spindle device for the purpose of driving a cutting tool or workpiece comprising:
   a spindle rotably and translatably supported by hydrostatic radial bearings;
   hydrostatic radial bearing mounted on each end of a housing through which the spindle extends, one end to which a hydraulic motor for rotating the spindle is attached, and the opposite end to hold a cutting tool or workpiece;
   a piston formed integral with the spindle, operating within a cylinder, in the area between the hydrostatic radial bearings to control translational position, velocity, and acceleration of the spindle, as hydraulic fluid is controllably introduced into the cylinder;
   a hydrostatic thrust bearing at each end of the cylinder to create an opposing force on the piston as it nears the end of its stroke, actuated by the piston substantially restricting a hydraulic fluid exit port as hydraulic fluid is introduced to the exit port end of the cylinder via an inlet port interconnected through a restrictor and inwardly allowing check valve to pressurized hydraulic fluid on the opposite side the piston, interchanging hydraulic fluid inlet and exit ports through external hydraulic fluid flow control devices moves the piston to unrestrict the previously restricted port, and closes the check valve to prevent hydraulic fluid escape from the pressurized side of the piston, said hydrostatic thrust bearings being effective to prevent wear arising from action of rotating piston forced unopposed against the cylinder end.

* * * * *